United States Patent
Rakas

(10) Patent No.: US 10,322,822 B1
(45) Date of Patent: Jun. 18, 2019

(54) SYSTEM AND METHOD FOR CONFIGURING AIRPORT TERMINALS USING MOBILE TERMINAL GATES

(71) Applicant: Jasenka Rakas, Atherton, CA (US)

(72) Inventor: Jasenka Rakas, Atherton, CA (US)

(73) Assignee: Jasenka Rakas, Atherton, CA (US)

( * ) Notice: Subject to any disclaimer, the term of this patent is extended or adjusted under 35 U.S.C. 154(b) by 25 days.

(21) Appl. No.: 15/225,733

(22) Filed: Aug. 1, 2016

Related U.S. Application Data

(60) Provisional application No. 62/282,489, filed on Jul. 30, 2015.

(51) Int. Cl.

| | |
|---|---|
| *B64F 1/30* | (2006.01) |
| *E05F 15/00* | (2015.01) |
| *E06B 3/46* | (2006.01) |
| *E01D 15/12* | (2006.01) |

(52) U.S. Cl.
CPC .............. *B64F 1/30* (2013.01); *E05F 15/00* (2013.01); *E06B 3/4636* (2013.01); *E01D 15/12* (2013.01); *E05Y 2400/45* (2013.01); *E05Y 2900/132* (2013.01)

(58) Field of Classification Search
CPC .......... B64F 1/30; E05F 15/00; E06B 3/4636; E01D 15/12; E05Y 2400/45; E05Y 2900/132
USPC ........................................................ 14/69.5
See application file for complete search history.

(56) References Cited

U.S. PATENT DOCUMENTS

| | | | | | |
|---|---|---|---|---|---|
| 3,538,529 | A | * | 11/1970 | Breier .................. | B64F 1/3055 14/71.5 |
| 4,888,531 | A | * | 12/1989 | Hormann .............. | G05D 3/127 318/282 |
| 6,315,243 | B1 | * | 11/2001 | Peterson .................. | B64F 1/00 244/114 R |
| 6,772,464 | B2 | * | 8/2004 | Hutton .................... | B64F 1/002 14/71.5 |
| 6,914,542 | B2 | * | 7/2005 | Hutton ...................... | B64F 1/00 244/114 R |
| 7,069,613 | B2 | * | 7/2006 | Hutton .................... | B64F 1/002 14/71.5 |
| 7,734,493 | B1 | * | 6/2010 | Anbil ............... | G06Q 10/06312 705/7.22 |
| 7,848,944 | B1 | * | 12/2010 | Anbil ............... | G06Q 10/06312 705/7.12 |
| 7,860,740 | B1 | * | 12/2010 | Anbil ............... | G06Q 10/06312 705/7.12 |
| 9,085,375 | B2 | * | 7/2015 | Cornell .................. | B61B 1/005 |
| 9,708,078 | B2 | * | 7/2017 | Cox ........................ | B64F 1/225 |
| 9,725,162 | B2 | * | 8/2017 | Cox ........................ | B64C 25/405 |
| 9,771,148 | B2 | * | 9/2017 | Cox ........................ | B64C 25/405 |
| 2004/0019984 | A1 | * | 2/2004 | Hutton .................... | B64F 1/002 14/71.5 |
| 2004/0090348 | A1 | * | 5/2004 | Hutton ...................... | B64F 1/00 340/958 |
| 2004/0237224 | A1 | * | 12/2004 | Hutton .................... | B64F 1/002 14/71.5 |
| 2012/0211606 | A1 | * | 8/2012 | Cornell .................... | B64F 1/30 244/137.2 |

(Continued)

*Primary Examiner* — Brent W Herring
(74) *Attorney, Agent, or Firm* — Wong & Rees LLP; Kirk D. Wong

(57) ABSTRACT

An airport terminal, having mobile terminal gates which are maneuverable to enable a controlling entity to configure the arrangement of terminal gate by quantity, type and/or spacing.

9 Claims, 8 Drawing Sheets

(56) References Cited

U.S. PATENT DOCUMENTS

| | | | |
|---|---|---|---|
| 2013/0138584 A1* | 5/2013 | Vana | G06Q 90/00 705/500 |
| 2015/0151834 A1* | 6/2015 | Cox | B64C 25/405 701/3 |
| 2015/0217872 A1* | 8/2015 | Cox | B64F 1/228 414/800 |

* cited by examiner

Top View

US 10,322,822 B1

SYSTEM AND METHOD FOR CONFIGURING AIRPORT TERMINALS USING MOBILE TERMINAL GATES

RELATED APPLICATIONS

This application claims benefit of priority to Provisional U.S. Patent Application No. 62/282,489, entitled SYSTEM AND METHOD FOR CONFIGURING AIRPORT TERMINALS USING MOBILE TERMINAL GATES and filed on Jul. 30, 2015; the aforementioned priority application being hereby incorporated by reference in its entirety for all purposes.

BACKGROUND

Airport surface congestion is a significant challenge faced by stakeholders in the aviation industry. As a result, considerable amounts of fuel and emissions are consumed and dispersed prior to departures and arrivals. Revenues are lost due to the scarce capacity available at the gate as the revenue-generating loads are commonly transferred at the gate. The lack of available gates poses not only congestion problems on the airside in airports in the United States, but also revenue loss for airlines and airport authorities. The number of airports that are gate-constrained in the United States are anticipating rapid growth in the decade ahead.

Generally, prior art terminal gates are static in dimension and span. The size of the terminal gate may thus dictate the size and number of planes which can be serviced at a terminal.

DETAILED DESCRIPTION

Figure 1:
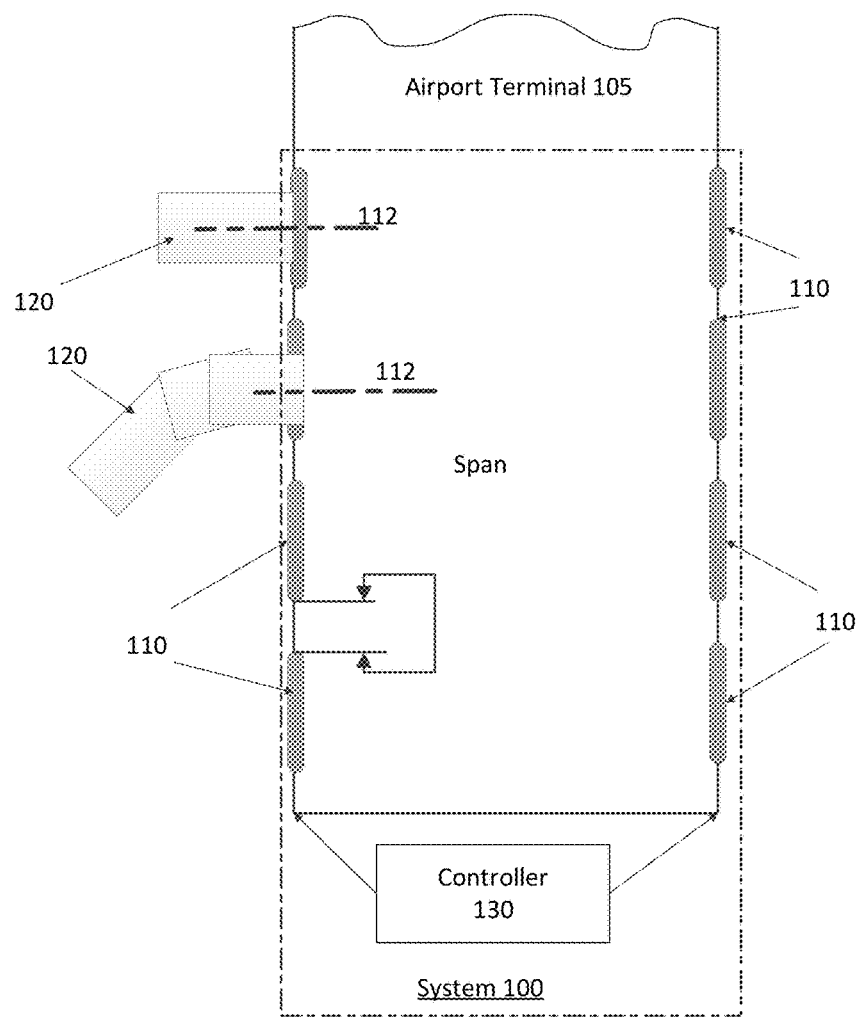
FIG. 1 illustrates an airport terminal system, in accordance with one or more embodiments.

A "terminal" refers to a portion of an airport which is positioned and/or structured to receive aircraft and passengers. Often, airport terminals enable aircraft to roll alongside, where passengers can board or deplane.

In general terms, a "terminal gate" refers to a gateway to and from an aircraft. For purpose of this disclosure, a "terminal gate" (or alternatively "gate") includes a passageway which enables passengers to pass through from the terminal to the entrance of the plane (or vice-versa).

Examples described herein provide for an airport terminal, and/or system for configuring an airport terminal, having mobile terminal gates which are maneuverable to enable a controlling entity to configure the arrangement of terminal gate by quantity, type and/or spacing. With such configurability, an airport entity can dynamically anticipate and meet terminal gate demand, while accommodating aircraft of varying sizes.

Among other benefits, some examples incorporate use of mobile terminal gates in a manner which permits aircraft of different sizes from utilizing the parking space allotted to the terminal. In this way, an airport terminal can be modified in accordance with dimensions of different aircraft which can use the terminal. Aspects of the mobile terminal gates can include an interior gate door and an exterior jet bridge. Depending on the implementation, the gate doors can be activated or made dormant, and when active, enable for the controlled passage of people between the interior of the airport terminal and the plane. Additionally, variations enable the gate doors to be positionable along the terminal in order to accommodate spacing of aircraft. In some variations, the jet bridges can also be maneuverable in order to be aligned with the door gates. Additionally, in some examples, the parking spaces, which accompany mobile terminal gates, can permit change in parking orientation and dimension of aircraft that use the terminal.

Still further, some examples provide for a control system that includes automated, self-propelled mechanisms that dynamically maneuver and manage the configuration of different aspects of the mobile gates at the airport terminal. Such a system can automate, for example, the location and/or spacing of terminal gates. In some variations, aspects with respect to the locomotion of jet bridges to active gates, as well as the placement or location of the jet bridges can be automated. Examples further include structures which are configured to facilitate the reception of a jet bridge against the airport terminal exterior, as well as to maneuver jet bridges laterally into position coinciding with an activated gate. In this way, the terminal gates can be activated and positioned to permit the passage of individuals to and from aircraft. Still further, the adaptability of the mobile terminal gates, including the jet bridges, permit mechanisms which at least partially automate or facilitate the provisioning of parking for aircraft of different sizes.

Among other benefits, examples as described enable an airport terminal to balance gate capacity to meet overall demand, and also meet demand from aircraft of various sizes. Examples also enable the terminal gates to vary in accommodating planes of different sizes. For example, more terminal gates may be provided in a terminal to accommodate planes of a limited size, but when needed, the number of terminal gates may be reduced so as to accommodate larger jet bridges and planes.

Airport Terminal System

FIG. 1 illustrates an airport terminal system, in accordance with one or more embodiments. In an example as shown, an airport terminal system 100 can be implemented in an airport terminal 105, to provide the airport terminal with multiple mobile terminal gates. As described in greater detail, the mobile terminal gates can be controlled individually and collectively to meet gate demand for arriving aircraft in a given period. In some implementations, the mobile terminal gates are selectively activated and de-activated, and further positioned or maneuvered so that the number and type of terminal gate at the airport terminal 105 can fluctuate based on need or other considerations.

When activated, the mobile terminal gates can be moved along the span of the airport terminal, so as to affect a distance between adjacent terminal gates of the airport terminal. In such examples, the activation of a given mobile terminal gate can include defining or forming a passageway (e.g., opening) between the interior and exterior of the airport terminal, and further by connecting a jet bridge to the defined opening.

In more detail, the airport terminal system 100 may dynamically configure a set of terminal gates 110 in an airport terminal. The airport terminal system 100 may include a terminal gate door sub-system, such as described with examples of FIG. 3A through FIG. 3G or FIG. 4A through FIG. 4C, to dynamically configure the terminal fates an airport terminal.

In some examples, the airport terminal system 100 may include control system 130 to perform operations that include determining the configuration of the terminal gates in the airport terminal. The control system 130 may implement a terminal gate allocation process to optimize a number and configuration of terminal gates in an airport terminal. An Example of a terminal gate allocation process is provided with an example of FIG. 5.

In some variations such as described with FIG. 5A through FIG. 5D, the airport terminal system 100 includes a rail structure which controls the connection of individual jet bridges in a manner that enables the jet bridge to align to locations determined based on a determined location of individual mobile terminal gates.

In an example of FIG. 1, the airport terminal system 100 includes a plurality of terminal gates 110, with each terminal gate 110 including a gate passageway 112 which can have an open state and a closed state. The gate passageway 112 for each terminal gates 110 can each correspond to, for example, a sliding door (or window), or structure which can be moved along a frame and/or track relative to another door or structure so as to form openings corresponding to passageways. The formation of passageways in this manner can coincide with the securement of jet bridges. In this way, from the interior of the airport terminal 105, the terminal gates 110 can be activated, so that the gate is ready for use. When activated, the passageway from the interior of the airport terminal 105 is formed, and the jet bridge 120 is securely connected to the exterior of the airport terminal 105 in alignment with the passageway.

According to some examples, the terminal gate 110 can be implemented to have multiple states of existence, using a terminal gate door sub-system, such as described with FIG. 3A through 5G and FIG. 4A through FIG. 4C. In some variations, the terminal gates 110 can have alternative dormant states, where a gate door, for example, is an enclosure to the exterior of the airport terminal 105. Additionally, when terminal gates 110 become dormant, a previously connected jet bridge can be disconnected and/or moved to another terminal gate.

A configuration of airport terminal 105 can be defined in part by characteristics of the terminal gates 110 when they are made active. Depending on implementations, the characteristics of the terminal gates 110 which are configurable can include quantity of terminal gates 110, location of individual terminal gates 110, and/or a distance between adjacent terminal gates 110. The configurations enable the airport terminal 105 to have varying numbers of terminal gates 110, as well as varying the number of terminal gates 110 for aircraft of different sizes. In the latter case, the spacing between active terminal gates 110 can be varied by, for example, adjusting the span between two active gates in order to accommodate larger/smaller aircraft and their parking configuration and space requirements. In one implementation, the span between active terminal gates 110 can be set by activating door structures of adjacent terminal gates 110 (see FIG. 3A through FIG. 3G or FIG. 4A through FIG. 4C) to move in position relative to one another, thereby defining the span between terminal gates 110. In variations, the gate passageway 112 can be made from moveable barriers or panel structures, which can be implemented through a terminal gate sub-system such as described with examples of FIG. 3A through FIG. 3G or FIG. 4A through FIG. 4C). In implementation, the panel structures provide barriers or terminal doors that can be moved in lateral position (e.g., along the length or span of the interior wall) in order to increase/decrease span between the adjacent terminal gates 110.

In one implementation, each gate passageway 112 can be provided through the use of moveable panels, which individually move within a frame that is integrated with the interior or exterior of the airport terminal 105. In variations, an interior terminal gate sub-system can be used to retain gate doors or barriers in position and also move the individual gate doors or barriers along the span of the airport terminal 105, as needed. The terminal gate sub-system can utilize, for example, multiple panel pairs, with the panels of each panel pair providing one of a door/opening or barrier.

In some examples, the airport terminal system 100 also includes jet bridges 120, which can be designed or configured to be controllable for positioning on the exterior of the airport terminal 105, in alignment with a corresponding gate passageway of an activated terminal gate 110. Each jet bridge 120 can be segmented and/or expandable. For example, each jet bridge 120 can include a base segment (e.g., rotunda) and a main segment. As described with examples of FIG. 5A through FIG. 5D, the exterior of the terminal 105 can include features to enable positioning of the jet bridge. The base segment of each jet bridge 120 can be connected first to the exterior of the airport terminal 105, with wheels on the bottom of the jet bridge 120 that can enable or facilitate controlled locomotion to a desired location coinciding with a formed passageway 112 of activated terminal gates 110. Once connected, the main segment of the jet bridge 120 can be connected. Optionally, a base segment of the jet bridge 120 can be expanded out to provide the main segment of the sub-system jet bridge 120. In some examples, an inventory of jet bridges 120 is available for the airport terminal system 100, with individual jet bridges 120 having a dimension (e.g., length) and orientation (straight, tilt right or left, etc.). The individual jet bridges 120 can be selected based on, for example, the type of aircraft which is to be serviced by the corresponding terminal gates 110.

The control system 130 can be operated by a controlling entity for the airport terminal 105. In one implementation, a single controlling entity exists to determine gate demand, and to activate/deactivate the terminal gates 110. For example, the controlling entity can correspond to an airport control center. As an alternative or variation, multiple controlling entities can exist, either under a master control or separately (e.g., with predefined rules). For example, airlines can be allocated space within the airport terminal 105, and available terminal gates 110 within the allocated space can be controlled by an airline controller. In either case, the control system 130 can operate as a programmatic or logical component which processes input for determining the configuration of the airport terminal 105 in a given period of time (e.g., morning or afternoon, a day, a week, an hour, etc.).

In some implementations, the control system 130 operates to determine gate demand, by quantity and/or by type. The control system 130 then uses the determined gate demand to select the terminal gates 110 that are to be activated for the given duration. Furthermore, the control system 130 can determine the span or distance between gates, by maneuvering door structures as described with examples of FIG. 3A through FIG. 3G or FIG. 4A through FIG. 4C. In this way, the airport terminal 105 can be configured for the determined gate demand based on a quantity of active terminal gates 110, as well as a distance between active terminal gates 110. Additionally, the gate demand can reflect the type of aircraft, and specifically the size of the aircraft.

In some examples, the control system 130 can select a suitable jet bridge 120 for each terminal gate 110 based on the type of aircraft which the terminal gate 110 is being allocated to service. In particular, examples recognize that aircraft generally have five sizes, with dimensions relevant for gate parking being based on the aircraft size. To accommodate gate demand in a manner which accounts for different aircraft types, the control system 130 may need to account for wingspan from the aircraft to the airport terminal 105, as well as between parked aircraft. The control system 130 can make selections which configure each terminal gate 110 based on (i) span between active gates, (ii) the dimension or configuration (e.g., right or left tilt) of each jet bridge 120 which is selected, and/or (iii) the relative location of an active gate with respect to the airport terminal 105 (e.g., larger aircraft are positioned further out).

In some implementations, the control system 130 outputs control information (e.g., computer generated data) which then identifies the activated terminal gates 110, the location of each terminal gate (in implementations in which the gate passageway 112 is moveable along the interior of the airport terminal 105), and the particular or type of jet bridge 120 needed for individual terminal gates 110.

In some variations, aspects of the airport terminal system 100 can be motorized and remote controlled. In such implementations, the barriers or door structures used to form the gate passageways 112 of each terminal can be remote controlled, so as to form the openings coinciding with the gate passageways through control signals provided from the control system 130. Still further, some or all aspects of the movement of the jet bridges 120 (or portions thereof) can be motorized and remote controlled.

By enabling the airport terminal system 100 to be configurable, the control system 130 can implement operations to optimize the utilization of mobile terminal gates within the airport terminal 105, thereby enabling the airport terminal 105 to have a configurable terminal gate arrangement that can be adjusted for demand. The optimization can be based on one or more criteria, such as (i) servicing the most number of aircraft in a given time period, (ii) enabling the most number of passengers to board/deplane, (iii) service the most number of aircraft of a particular type (or conversely, least number of aircraft of a particular type), and/or (iv) service aircraft based on alternative criteria such as departure location.

In some variations, the control system 130 can be operated by airlines (or other private entities). Rather than allocating gates to airlines, as implemented in some conventional approaches, an example of FIG. 1 may permit allocating space to airlines, from which a variable number of terminal gates 110 and of different types can be created or made dormant as needed. Furthermore, some examples enable exchange rules among parties within the airport terminal 105 in order to exchange terminal gates 110 (e.g., activate otherwise unused mobile gate) for another carrier who may have need for it (e.g., when one carrier suffers disproportionately from weather delays).

Methodology

Figure 2:
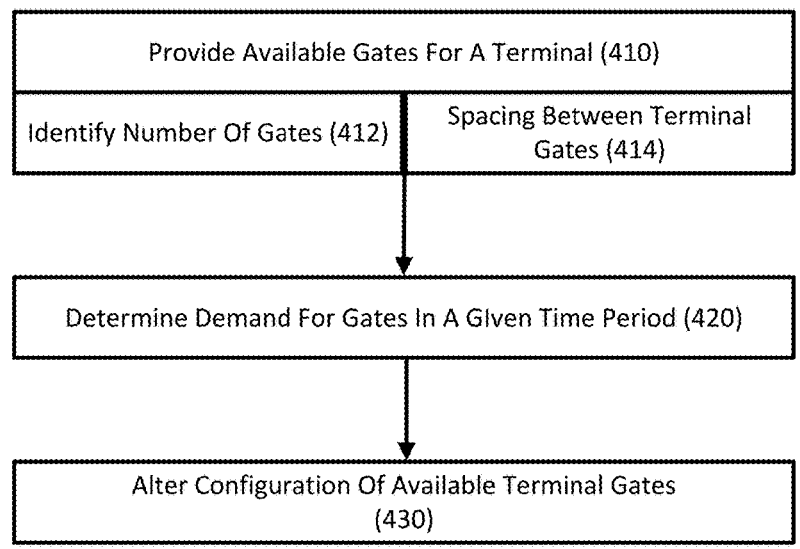
FIG. 2 illustrates an example terminal gate allocation process to optimize a number and configuration of terminal gates in an airport terminal, according to one or more embodiments.

FIG. 2 illustrates an example method for method for operating an airport terminal, according to one or more examples. A method such as described with FIG. 2 may be implemented using a computer system that controls at least a portion of the incoming and outgoing flights of an airport. For example, an example of FIG. 2 may be implemented using a server, combination of servers, or other network computer system to control an airport. With reference to an example of FIG. 1, a method such as described with FIG. 2 may be implemented on a system such as described with FIG. 1. For example, the control system 130 may implement a process such as described with FIG. 2.

According to some examples, a computer system may implement a gate configuration to provide available gates of a terminal (410). The configuration may be implemented using dynamically formed gates, such as described with examples of FIG. 3A through FIG. 3G and FIG. 4A through FIG. 4C. Among other aspects, the configuration may identify a number of terminal gates (412), and/or a spacing between adjacent terminal gates (414).

The computer system may determine a demand for gates in a given time period (420). The demand may be determined from, for example, historical information. In variations, the demand may be based on business logic, implemented by airlines or other entities which may anticipate demand from fare sales. As events, another example, variations in demand can be anticipated from events, such as weather delays, or periods following weather delays.

The computer system may alter the configuration of available terminal gates based on the demand (430). For example, the number of terminal gates may be increased or decreased based on the demand. As an addition or variation, the spacing between adjacent gates can be changed to provide more or fewer gates to meet the determined demand.

Terminal Gate Sub-System

FIG. 3A through FIG. 3G illustrates a terminal gate sub-system, according to one or more embodiments. In some examples, a terminal gate door sub-system 500 may be used to form gate passageways 524 in a terminal.

Figure 3A:
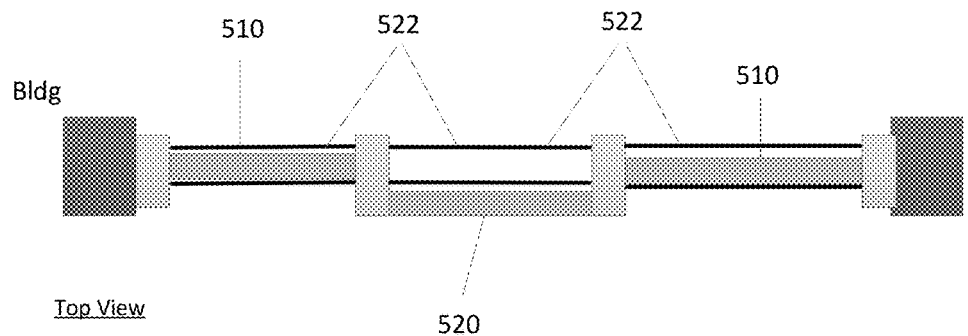
FIG. 3A illustrates a gate passageway system for forming gate passageways as part of a mobile terminal gate system, according to one or more embodiments.
Figure 3B:
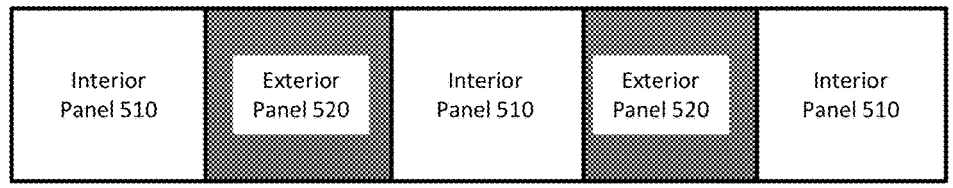
FIG. 3B through FIG. 3G illustrate front views of a gate passageway system of FIG. 3A.

FIG. 3A illustrates a top view of a terminal gate sub-system, showing a set of interior panels 510 (e.g., terminal doors) and a set of exterior panels 520. At least one of the interior or exterior door panels 510, 520 are moveable along one or more track structures 522 into alternative overlapping positions. In some examples, the one or more track structures (continuous track or discrete track components) 522 can be positioned to receive the interior panels 510, 510, so as to enable the interior panels 510 to slide or otherwise be moved into a desired linear position that can form an opening relative to another interior or exterior panel 510, 520. As described with various examples, the interior panels 510, 510 can be moved to define openings that correspond to the gate passageways 524. The openings that are formed by the panels 510, 510 can be located at one or more pre-determined positions. Additionally the openings that are formed by the interior panels 510 can be of a pre-determined dimension, or range of dimensions. The openings can be used to accommodate and provide the gate passageways 524, and the adjustability of the interior panels 510, 510, enable multiple types of gate passageways 524 to be accommodated by the positioning of the interior panels 510, 510. According to an example of FIG. 3A, when the interior panels 510, 510 are expanded to substantially not overlap, the opening for the gate passageways 524 may be closed. When the interior panels 510, 510 are moved to overlap, one or more gate passageways 524 can be formed.

According to some examples, the exterior panels 520 are fixed or rigid structures that are spaced from one another by interior panels 510, which can be moved over the track structures 522. For example, the exterior panels 520 can be implemented as structural or load bearing walls of a terminal. Alternatively, the exterior panels 520 can be immobile and structured to be attached and removable from the terminal. For example, the exterior panels 520 can be attached to the terminal by fasteners, which can be manipulated to release or move the exterior panels 520. In variations, the exterior panels 520 can be provided on track structures similar to those shown and described with the interior panels 510, to enable linear movement and positioning relative to other panels to form openings for gate passageways.

Figure 3C:
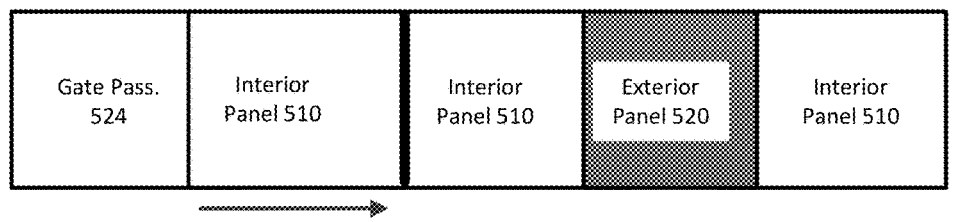
Figure 3D:
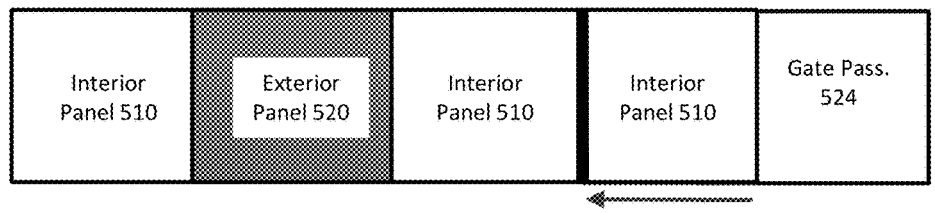

FIG. 3B through FIG. 3G illustrate front views of the gate passageway system of FIG. 3A, in alternative configurations. Examples of FIG. 3B through FIG. 3F can be implemented on a portion of a terminal, using a combination of three moveable panels (e.g., interior panels 510). In the examples shown, a combination of three interior panels 510 and two exterior panels 520 can form any one of three gate passageways 524, with alternative configurations in which two or three gate passageways 524 are provided concurrently. In a configuration of FIG. 3B, adjacent panels 510, 520, 510, 520, 510 are extended so that all possible gate passageways 524 are closed. In configurations of FIG. 3C and FIG. 3D, one interior panel 510 is slid (e.g., using track structure 522) over a length that may include the adjacent exterior panel 520 and/or the next interior panel 510 to form a single. passageway 524. For example, in FIG. 3C, the left interior panel 510 is shown to occupy a position that is in front of the adjacent (relative to the directional arrow) exterior panel 520. Likewise, in FIG. 3D, the right interior panel 510 is shown to occupy a position that is in front of the adjacent (relative to the directional arrow) exterior panel 520. While FIG. 3C and FIG. 3D illustrate a respective interior panel 510 moving to occupy a position that is in front of, or behind the adjacent exterior panel 520, in variations, the interior panels 510 can be moved to alternative lateral positions. For example, the left and right interior panels 510, 510 can share a track structure 522 to enable each of the respective panels to occupy a lateral position that can be over their respective adjacent exterior panel, next interior panel 510, or next exterior panel 520 (e.g., so that the left or right interior panels 510, 510 are adjacent to one another).

Figure 3E:
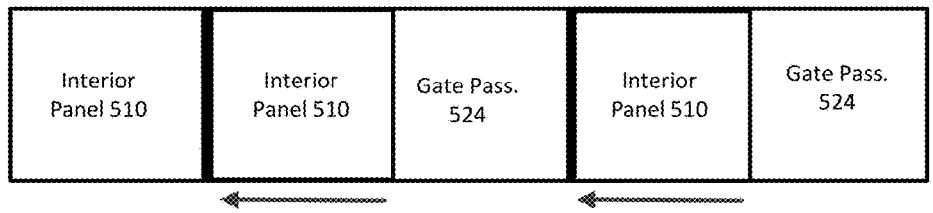
Figure 3F:
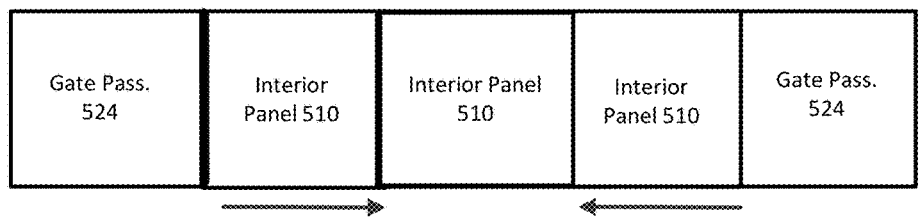

In a configuration of FIG. 3E, two interior panels 510 are moved to form a pair of gate passageways 524. In one implementation, the right interior panel 510 is moved leftward to form the first gate passageway 524, and the middle interior panel 510 is moved rightward to form the second gate passageway 524. For example, the respective right and left interior panels 510 can be moved over respective adjacent panels 520. In variations, the left and/or right interior panels 510 can be moved over the middle interior panel 510. In other variations, the left and right interior panels 510 can be provided separate interior tracks 522 which overlap in length (e.g., tracks provided at separate distances from a parallel axis of one of the panels) and the respective interior panel 510 can be moved to any lateral position that can be accommodated on the length of the track.

Figure 3G:
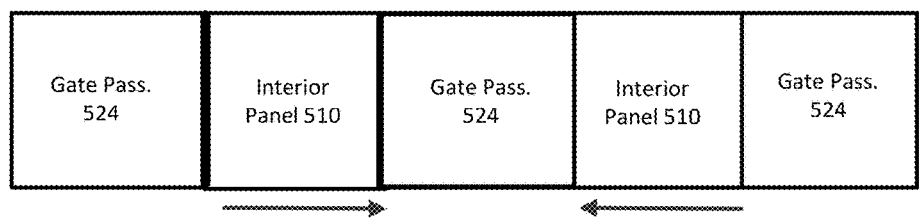

In FIG. 3G, the interior panels 510 can each be moved to form three gate passageways 524. In one implementation, two or more of the interior panels 510 can be provided a separate track such that the respective interior panels can be moved to overlap with one another. Separate interior tracks 522 can thus be provided so that two interior panels 510 are located over the left exterior panel 520, or alternatively three interior panels 510 are moved to a single position (e.g., over one exterior panel 520 etc.).

While examples of FIG. 3A through 5G illustrate interior panels 510 which can be moved laterally over exterior panels or other interior panels, in variations, the interior panels 510 can be moved to, for example, a single location at an adjacent segment. Moreover, in variations, the interior panels 510 can remain fixed, while the exterior panels 520 are moved. Other arrangements of sliding panels can also be used to move panels relative to one another along a sidewall of a terminal.

Accordingly, with examples described, gates may be formed on-demand, and/or through use of a schedule that enables demand for gates to be determined. Moreover, a terminal may accommodate a variable number of gates at a given duration of time.

Figure 4A:
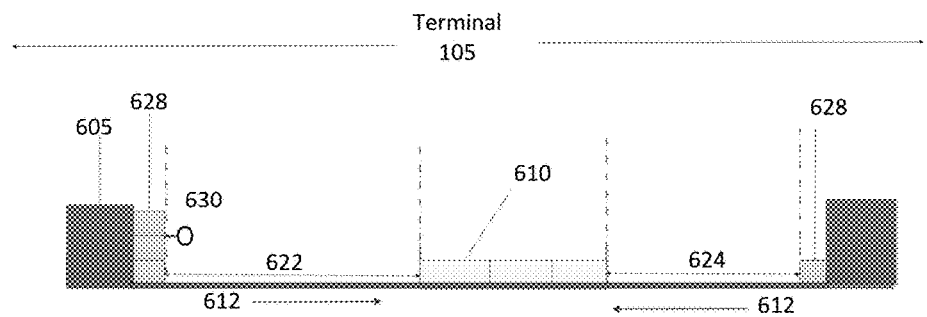
FIG. 4A through FIG. 4C illustrate an example gate passageway system to utilize barrier blocks to dynamically implement a gate configuration on a portion of a terminal.
Figure 4B:
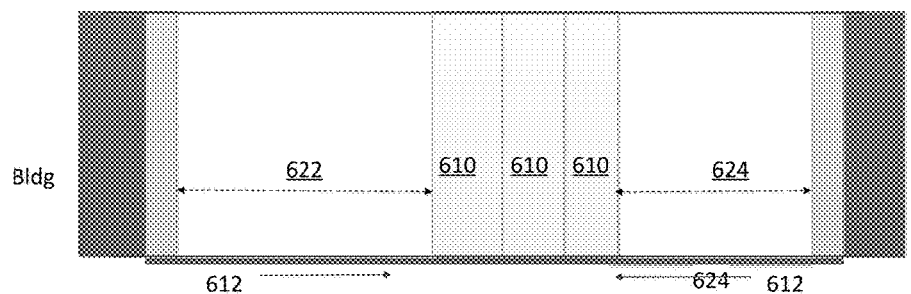
Figure 4C:
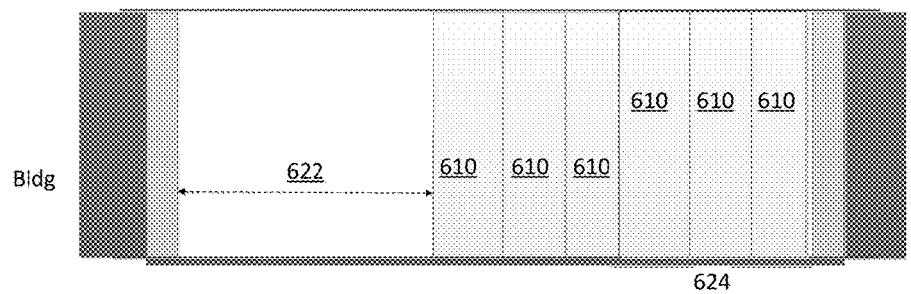

FIG. 4A illustrates a top view of an alternative gate passageway system which utilizes barrier blocks 610, according to another embodiment. FIG. 4B and FIG. 4C are frontal views illustrating examples for using barrier blocks, according to an embodiment such as shown with FIG. 4A. With reference to FIG. 4A through FIG. 4C, examples illustrate an alternative embodiment in which barrier blocks 610 can slide on a track 612 to define adjacent gate passageways 624. For example, in FIG. 4A and FIG. 4B, adjacent gate passageways 622, 624 are separated by a first number of barrier blocks 610, so that a distance between the gate passageways 622, 624 is a first span. Additional barrier blocks may be stored in a reservoir 628, which can be provided with the airport terminal 105. For example, the reservoir 628 can be provided against a permanent structure 605 of the terminal section 105.

In examples of FIG. 4A through FIG. 4C, the barrier blocks 610 can be moved along a single track 612 to occupy various positions along a section of a terminal wall. In variations, the barrier blocks 610 can be distributed to multiple tracks 612. The addition and subtraction of the barrier blocks 610 can add or remove terminal gate passageways 622, 624 from the segment of the terminal wall. Additionally, the addition and subtraction of the barrier blocks 610 can vary the dimension or spacing of the gate passageways, to, for example, accommodate different plane sizes or expected traffic.

Furthermore, while an example as shown provides for two gates to be dynamically formed and/or adjusted by the barrier blocks 610, in variations, three or more gates can be formed as shown. The use of the barrier blocks 610 can enable the dynamic formation of gate passageways, as well as gate dimensions (e.g., to accommodate different aircrafts). Moreover, the barrier blocks 610 enable the span between gate passageways to be configured, in that the distance between gates can be made closer or further as needed for gate size or quantity.

The barrier blocks 610 can include structures or interfaces for receiving a portion of a jet bridge. For example, each barrier block 610 can provide an external surface which can receive and secure to a jet bridge.

In an example of FIG. 4C, one barrier block 610 is removed from the set of barrier blocks, so that the first gate passageway 622 is larger. Additionally, the span between the gate passageways is made smaller through manipulation of the moveable barrier blocks. In each case, the barrier bocks can form an exterior frame for receiving a jet bridge.

Exterior Structures for Jet Bridges

Figure 5A:
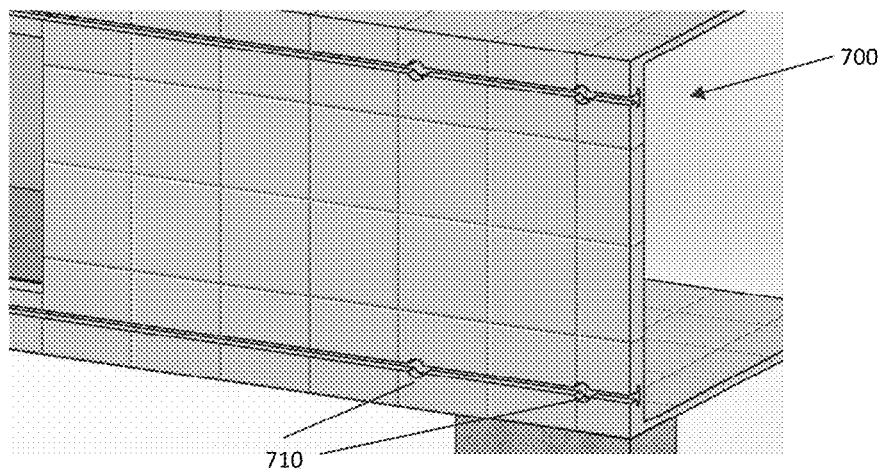
FIG. 5A through FIG. 5D illustrate example perimeter structures to modify an exterior of a terminal to accommodate moveable jet bridges, for use with some embodiments as described.
Figure 5B:
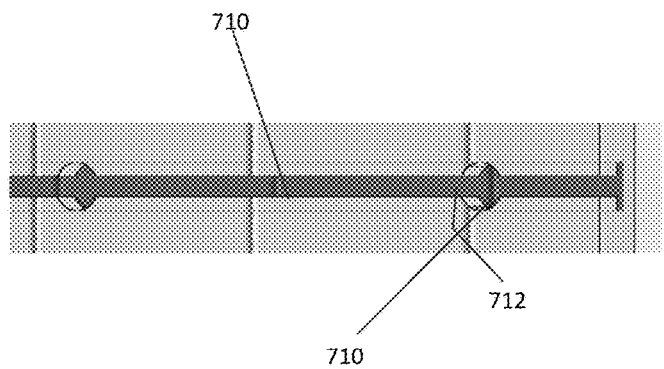

FIG. 5A and FIG. 5B illustrate example perimeter structures for use in providing jet bridges that can connect to dynamically formed terminal gates, according to one or more embodiments. Some examples of FIG. 5A and FIG. 5B may be employed with example terminal gate sub-systems, such as described with FIG. 3A through FIG. 3G or FIG. 4A through FIG. 4C.

With respect to FIG. 5A, an exterior 702 of a terminal can be provided a perimeter structure 700 to receive jet bridges (FIG. 5C and FIG. 5D) that can be moved laterally. The perimeter structure 700 can be continuous or formed from different lengths to extend a linear segment of a terminal, or partially circumvent an exterior of an airport terminal building. The perimeter structure 700 includes a pair of rails 710 which can connect to and receive connectors of a jet bridge 720 (see FIG. 5C and FIG. 5D). For example, the jet bridges 720 can include wheeled-connectors that engage the rails individually, in order to enable the jet bridges 720 to be moved and connected to dynamic terminal gates, such as those provided with panels (see FIG. 3A through FIG. 3G) or barrier blocks (see FIG. 4A through FIG. 4C). In this way, the rails 710 can provide a physical interface for receiving and securing jet bridges 720.

With reference to FIG. 5B, the perimeter structure 700 may include rails 710 which are provided or integrated with circular openings 712. The circular openings may be dimensioned in structure to receive attachment/detachment points of the connecting jet bridge 720. Collectively, the rails 710 and circular openings 712 can enable a given jet bridge 720 to connect and disconnect from the perimeter structure 700. When connected, the perimeter structure 700 secures the jet bridge 720 to prevent vertical and perpendicular movement, so that the jet bridge can safely accommodate the passage of people.

As described with other examples, the perimeter structure 700 may locate the rails 710, openings 712 and/or other securement features at the strategic end points of the airport terminal 105 in order to receive and retain jet bridges 720 as needed. The perimeter structures 700 can be fixed to the exterior of the terminals, coinciding with locations where dynamic terminal gates may be formed. Jet bridges 720 can be connected and engaged to be moveable along the perimeter structure 700, so that individual jet bridges can be moved into position to join a gate passageway formed by a dynamic terminal gate. The jet bridges 720 can be retained in engagement along a desired region of the exterior when not in use, and moved into position as needed using the perimeter structure.

FIG. 5B further illustrates an implementation of the perimeter structure 700, in which the openings 712 converge in opposite directions to secure a mated jet bridge structure. Such a configuration enables a jet bridge for a given airport terminal 105 to be stored next to the terminal and then brought into use with minimal interference with foot traffic and transportation operations. In some implementations, the jet bridge is contracted before being attached to the perimeter structure 700. Once attached, the jet bridge structure can be expanded to the appropriate length for accommodating an aircraft of a particular size. The jet bridge structures can also be moved along the perimeter structure 700 and stopped at an appropriate position corresponding to a desired gate location. The stopping mechanism for controlling when the jet bridge structure will stop can be implemented through a variety of mechanisms.

Figure 5C:
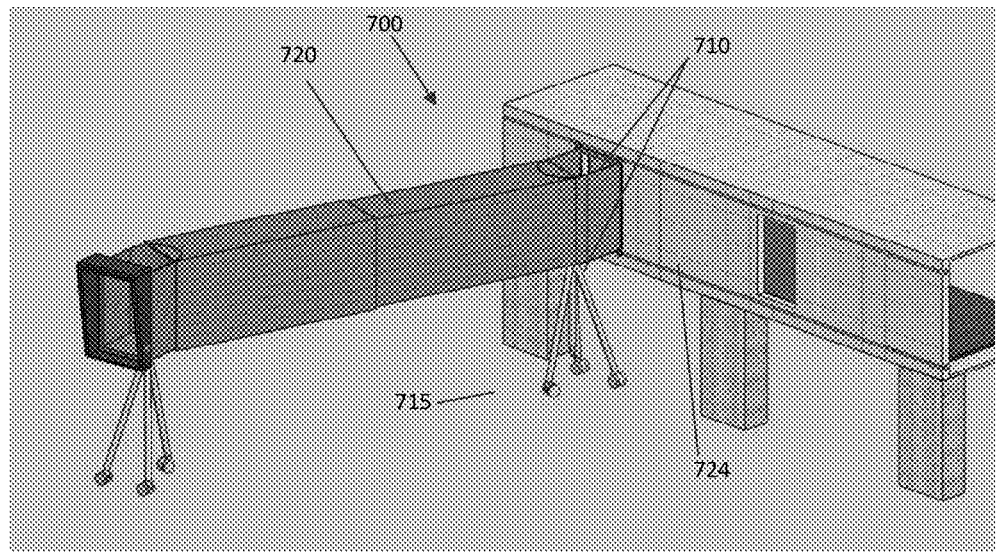

In FIG. 5C, the jet bridge 720 is shown to include wheels 715 to facilitate lateral movement along the rails 710. The jet bridge 720 can also be motorized to enable the structure to be moved into position of a dynamically formed terminal/gate passageway 724 while remaining connected to the rails 710 of the perimeter structure.

Figure 5D:
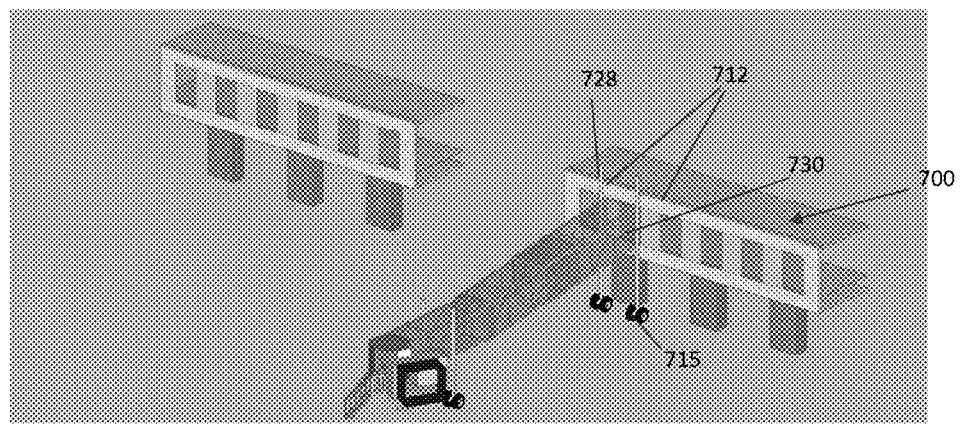

FIG. 5D illustrates a variation for the perimeter structure 700. In an example shown, the perimeter structure 700 includes a rail 712 that is positioned on a top 703 surface (e.g., roof) of the terminal 105. The jet bridge includes extensions 730, with laterally extended arms 728 that extend across and over the top 703 of the terminal 105 to slide along the rails 712. Wheels 715 may facilitate movement by the jet bridge 720. This allows the jet bridge 720 to move laterally along a length of the terminal.

Computer System

Figure 6:
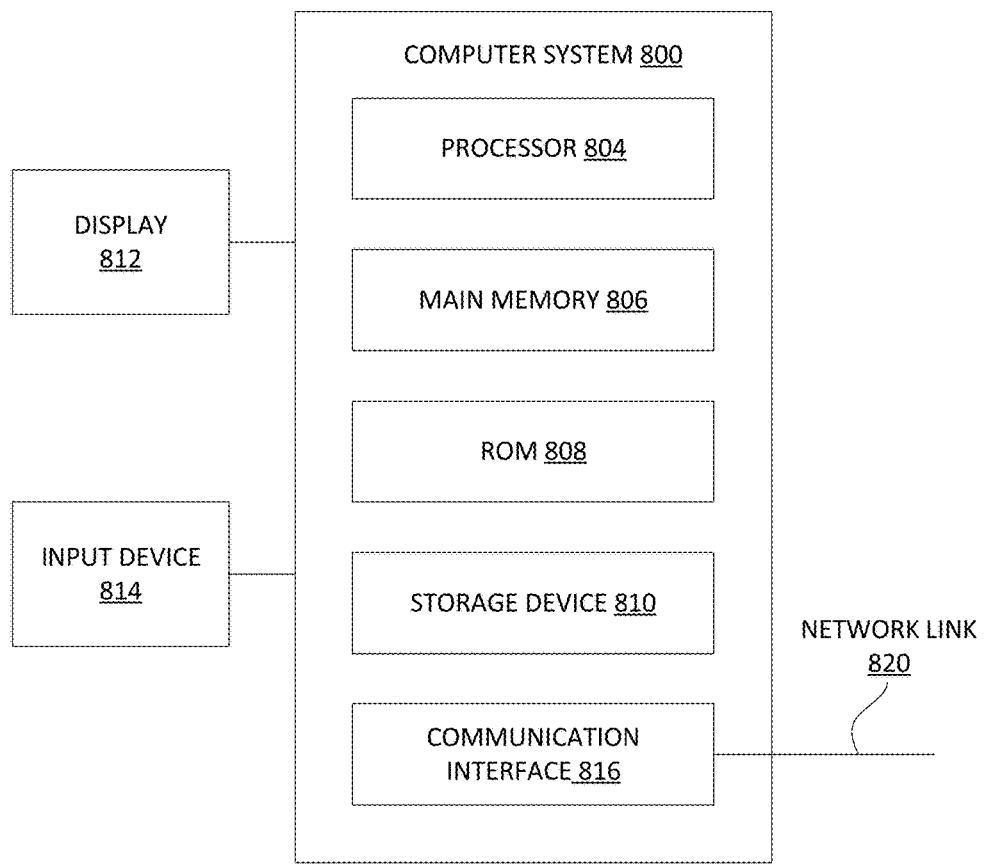
FIG. 6 illustrates a computer system on which an example control system may be implemented, according to one or more embodiments.

FIG. 6 is a block diagram that illustrates a computer system upon which embodiments described herein may be implemented. For example, in the context of FIG. 1, control system 130 may be implemented using a computer system such as described with FIG. 6. Likewise, a method such as described with an example of FIG. 5 may be implemented using a computer system such as described with FIG. 6.

In an embodiment, computer system 800 includes processor 804, main memory 806, ROM 808, storage device 810, and communication interface 816. Computer system 800 includes at least one processor 804 for processing information. Computer system 800 also includes a main memory 806, such as a random access memory (RAM) or other dynamic storage device, for storing information and instructions to be executed by processor 804. Main memory 806 also may be used for storing temporary variables or other intermediate information during execution of instructions to be executed by processor 804. Computer system 800 may also include a read only memory (ROM) 808 or other static storage device for storing static information and instructions for processor 804. A storage device 810, such as a magnetic disk or optical disk, is provided for storing information and instructions. The communication interface 816 may enable the computer system 800 to communicate with one or more networks through use of the network link 820.

Computer system 800 can include display 812, such as a cathode ray tube (CRT), a LCD monitor, and a television set, for displaying information to a user. An input device 814, including alphanumeric and other keys, is coupled to computer system 800 for communicating information and command selections to processor 804. Other non-limiting, illustrative examples of input device 814 include a mouse, a trackball, or cursor direction keys for communicating direction information and command selections to processor 804 and for controlling cursor movement on display 812. While only one input device 814 is depicted in FIG. 6, embodiments may include any number of input devices 814 coupled to computer system 800.

Embodiments described herein are related to the use of computer system 800 for implementing the techniques described herein. According to one embodiment, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for operating an airport terminal, the method comprising:
   creating a configuration of mobile terminal gates, the configuration identifying a number of mobile terminal gates, and a spacing between adjacent mobile terminal gates;
   determining a demand for mobile terminal gates in a given time period; and
   based on the demand, dynamically altering the configuration of mobile terminal gates, so that the number of mobile terminal gates and the spacing between adjacent mobile terminal gates are changed to provide more or fewer mobile terminal gates to meet the determined demand;
   wherein altering the configuration includes moving one or more panels extending along a length of at least a portion of the airport terminal in order to form a gate passageway for a new mobile terminal gate when providing more mobile terminal gates to meet the determined demand, the gate passageway extending between an interior and an exterior of the airport terminal.

2. The method of claim 1, wherein a location of individual mobile terminal gates along a span of the airport terminal can be selected based on the configuration.

3. The method of claim 1, wherein creating the configuration is performed to meet the determined demand for a particular type of aircraft.

4. The method of claim 1, wherein creating the configuration includes controlling a movement of the one or more panels between open and closed positions.

5. The method of claim 1, wherein creating the configuration includes controlling a movement of at least one panel structure along a track of the mobile terminal gate.

6. The method of claim 5, wherein moving the one or more panels includes sliding at least a first panel along the track.

7. The method of claim 5, wherein the track extends along an interior of the terminal.

8. The method of claim 1, further comprising:
   securing a jet bridge to an external portion of a new mobile terminal gate.

9. The method of claim 1, wherein the one or more panels are moved via remote control.

* * * * *